United States Patent Office 3,544,577
Patented Dec. 1, 1970

3,544,577
1 - PYRIDYL - 1,2,3,4 - TETRAHYDROISOQUINO-
LINE SUBSTITUTION PRODUCTS AND SALTS
THEREOF
Ernst Seeger, Alpenstrasse 39; Wolfhard Engel, Wolfen-
talstrasse 32; and Helmut Teufel, Talfeldstrasse 48, all
of Biberach an der Riss, Germany
No Drawing. Filed June 7, 1967, Ser. No. 644,098
Claims priority, application Germany, June 16, 1966,
T 31,376
The portion of the term of the patent subsequent to
July 22, 1986, has been disclaimed
Int. Cl. C07d 35/34
U.S. Cl. 260—287                                8 Claims

ABSTRACT OF THE DISCLOSURE

The compounds are substitution products of 1-pyridyl-1,2,3,4 - tetrahydro-isoquinoline useful as antiphlogistics, antipyretics, analgesics and spasmolytics in warm-blooded animals.

This invention relates to novel substitution products of 1 - pyridyl-1,2,3,4-tetrahydro-isoquinoline and acid addition salts thereof, as well as to various methods of preparing these compounds.

More particularly, the instant invention relates to 1-pyridyl-1,2,3,4-tetrahydro-isoquinolines of the formula

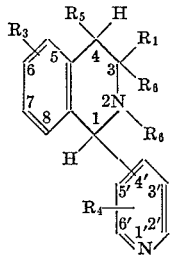

(I)

wherein $R_1$ is alkyl of 1 to 5 carbon atoms, benzyl or methylbenzyl,
$R_2$ is alkyl of 1 to 5 carbon atoms,
$R_3$ is hydrogen, lower alkyl or halogen,
$R_4$ and $R_5$ are each hydrogen or lower alkyl,
$R_6$ is hydrogen, alkyl of 1 to 3 carbon atoms or alkanoyl of 1 to 3 carbon atoms, and
the pyridyl ring is attached to the tetrahydroisoquinoline nucleus through the 3- or 4-carbon atom of the pyridyl ring, and their non-toxic, pharmacologically acceptable acid addition salts.

The compounds according to the present invention may be prepared by a number of different methods involving well known chemical principles, among which the following have proved to be particularly convenient and efficient.

Method A.—By reducing a 1-(3- or 4-pyridyl)-3,4-dihydroisoquinoline of the formula

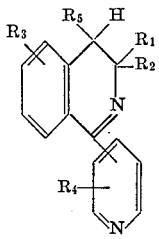

(II)

wherein $R_1$, $R_2$, $R_3$, $R_4$ and $R_5$ have the same meanings as in Formula I, according to customary methods, with or without simultaneous attachment of a methyl or formyl substituent on the nitrogen atom of the isoquinoline ring.

The reduction without simultaneous introduction of a substituent on the nitrogen atom of the isoquinoline ring may, for example, be effected with the aid of catalytically activated or nascent hydrogen, complex metal hydrides or formic acid, preferably in the presence of a hydrogenation catalyst. Under these conditions the end product is a compound of the Formula I wherein $R_6$ is hydrogen.

The reduction may be coupled with simultaneous introduction of a formyl substituent on the nitrogen atom of the isoquinoline ring by extending the reaction time with formic acid, with or without the presence of a hydrogenation catalyst such as Raney nickel, from one hour to six hours, for instance. Under these conditions the end product is a compound of the Formula I wherein $R_6$ is formyl. An N-formyl-substituted compound may also be obtained by carrying out the reduction with formic acid in the presence of formamide at elevated tempertaures.

A compound of the Formula I wherein $R_6$ is methyl may be obtained by effecting the reduction by means of catalytic reduction in the presence of formaldehyde or by means of formic acid in the presence of paraformaldehyde.

The reduction by means of hydrogen is advantageously carried out in the presence of a suitable metal catalyst, such as platinum oxide, palladinized charcoal, Raney nickel or copper-chromium oxide. The hydrogenation reaction is carried out either at room temperature and slightly elevated pressure or at elevated temperatures and high pressure, depending upon the catalyst which is used. For instance, when copper-chromium oxide or Raney nickel is used as the catalyst, it is advantageous to work at a temperature from 100–130° C. and at a pressure of about 100 atmospheres.

For the reduction with nascent hydrogen it is preferred to use tin, zinc or zinc amalgam and a dilute mineral acid to generate the nascent hydrogen.

Method B.—For the preparation of a compound of the Formula I wherein $R_6$ is hydrogen, by subjecting a primary amine of the formula

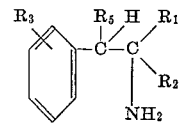

(III)

wherein $R_1$, $R_2$, $R_3$ and $R_5$ have the same meanings as in Formula I, to a cyclizing dehydration reaction with a pyridine-3- or pyridine-4-aldehyde of the formula

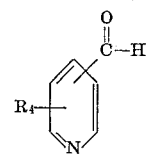

(IV)

wherein $R_4$ has the same meanings as in Formula I. A preferred embodiment of this method consists of first converting the primary amine III into the corresponding Schiff's base with the pyridine-aldehyde IV under dehydrating conditions pursuant to customary methods, and then cyclizing the Schiff's base in customary fashion with a suitable cyclizing agent, such as polyphosphoric acid, 100% phosphoric acid and phosphorus pentoxide.

In some cases this reaction is advantageously carried out in the presence of an inert organic solvent, such as o-dichlorobenzene or tetrahydronaphthalene. The reaction may, however, also ba carried out without a solvent; it is performed at elevated temperatures, preferably between 60 and 220° C.

*Method C.*—For the preparation of a compound of the Formula I wherein $R_6$ is lower alkyl or lower alkanoyl, by reacting a pyridyl-3- or pyridyl-4-tetrahydroisoquinoline of the formula

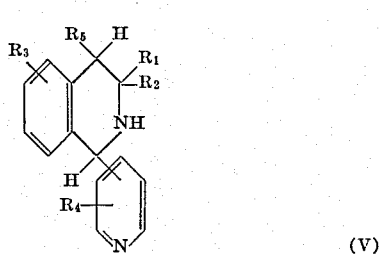

(V)

wherein $R_1$ through $R_5$ have the same meanings as in Formula I, with a carboxylic acid anhydride or carboxylic acid halide of a lower alkanoic acid.

The reaction is advantageously carried out in the presence of an acid-binding compound, that is, a compound which ties up or neutralizes the acid released by the reaction, and initially yields a compound of the Formula I wherein $R_6$ is lower alkanoyl. If desired, this N-lower alkanoyl-substituted tetrahydroisoquinoline compound may then be connected into the corresponding N-lower alkyl-substituted tetrahydroisoquinoline compound by reduction with a suitable reducing agent, such as a complex metal hydride, especially lithium aluminum hydride.

If it is desired to introduce an N-methyl substituent into compound V, this substitution may also be accomplished directly by a one-step reaction, namely, by reacting compound V with paraformaldehyde and formic acid or with formaldehyde and catalytically activated hydrogen in the presence of a hydrogenation catalyst, such as Raney nickel.

*Method D.*—For the preparation of a compound of the Formula I wherein $R_6$ is lower alkyl and $R_4$ is hydrogen, by reacting a 3,4-dihydro-isoquinolinium salt of the formula

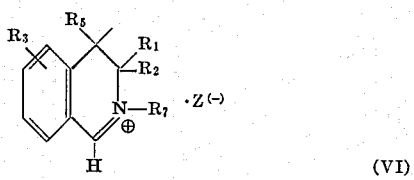

(VI)

wherein $R_1$, $R_2$, $R_3$ and $R_5$ have the same meanings as in Formula I, $Z^{(-)}$ is a monovalent anion, preferably a halide anion, and $R_7$ is lower alkyl, with an organo-metallic pyridyl compound of the formula

(VII)

wherein X is MgHal (Hal=halogen) or lithium in 3- or 4-position on the pyridine ring. The reaction is carried out in the presence of a suitable inert organic solvent, such as an aliphatic or cyclic ether, a hydrocarbon or a hydrocarbon-ether mixture, advantageously with an excess of 0.2 to 1.5 mols of the organo-metallic pyridyl compound over and above the amount stoichiometrically required for reaction per mol of dihydroisoquinolinium salt, preferably at a temperature between −70 and +70° C., and if necessary in an atmosphere of an inert gas.

The starting compounds required for methods A through D may be prepared according to well known methods.

For instance, a compound of the Formula II may be obtained by the methods described in copending application Ser. No. 531,042, filed Mar. 2, 1966 now U.S. 3,457,265.

A compound of the Formula III may, for example, be obtained by hydrolysis of the formyl group in an N-formyl-β-phenyl-ethylamine of the formula

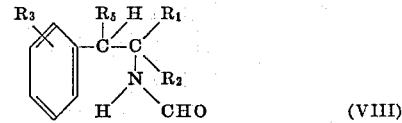

(VIII)

wherein $R_1$, $R_2$, $R_3$ and $R_5$ have the same meanings as in Formula I. Compound VIII, in turn, may be prepared by the process described by J. Ritter et al. in J.A.C.S. 70, 4048 (1948).

A compound of the Formula V may be prepared by method A or B above.

A compound of the Formula VI may be obtained by subjecting an N-formyl-β-phenyl-ethylamine of the Formula VIII to a cyclization reaction with the aid of a condensation agent, such as polyphosphoric acid, and subsequent quaternization pursuant to customary methods, such as with an alkyl halide.

The compounds embraced by Formula I are organic bases and, therefore, form acid addition salts with inorganic or organic bases. Examples of non-toxic, pharmacologically acceptable acid addition salts include, but are not limited to, those formed with hydrochloric acid, hydrobromic acid, sulfuric acid, phosphoric acid, succinic acid, tartaric acid, citric acid, adipic acid, maleic acid, fumaric acid, 8-chlorotheophylline and the like. Such non-toxic salts may be prepared in customary fashion; for instance, most conveniently by dissolving the free base in a suitable solvent and acidifying the solution with the desired acid.

The following examples further illustrate the present invention and will enable others skilled in the art to understand it more completely. It should be understood, however, that the invention is not limited to the particular examples given below.

EXAMPLE 1

Preparation of 3,3-dimethyl-1-(pyridyl-4′)-1,2,3,4-tetrahydro-isoquinoline by method A 11.8 gm. of 3,4-dihydro-3,3-dimethyl-1-(pyridyl-4′)-isoquinoline were dissolved in 100 cc. of methanol, and 1.2 gm. of palladinized charcoal (10% by weight palladium) were added thereto. The resulting mixture was then hydrogenated at 50° C. in a shaking autoclave at a hydrogen pressure of 50 atmospheres until the calculated amount of hydrogen had been absorbed. Thereafter, the catalyst was filtered off, the filtrate was evaporated, and the residue was recrystallized from petroleum ether. 9.5 gm. of 3,3-dimethyl-1-(pyridyl-4′)-1,2,3,4-tetrahydro-isoquinoline, M.P. 96–98° C., of the formula

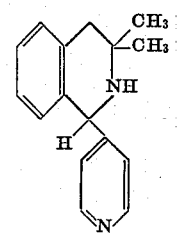

were obtained.

Its hydrogen maleate had a melting point of 183–185° C. (decomposition).

When Raney nickel was used as the catalyst in place of palladinized charcoal and the hydrogenation was performed at 100° C. and 100 atmospheres pressure, the same yield of the tetrahydroisoquinoline compound was obtained.

When copper-chromium oxide was used as the catalyst and the hydrogenation was performed at 120° C. and 100 atmospheres pressure, the yield of the tetrahydroisoquinoline compound was quantitative.

When the hydrogenation was carried out at room temperature at 2 to 3 atmospheres pressure with platinum oxide as the catalyst, the yield of the tetrahydroisoquinoline compound was 8 gm.

EXAMPLE 2

11.8 gm. of 3,4-dihydro-3,3-dimethyl-1-(pyridyl-4')-isoquinoline were dissolved in 100 cc. of methanol and, while stirring, 2.25 gm. of sodium borohydride were added to the solution in small portions. Thereafter, the mixture was refluxed for two hours while stirring, 4.5 gm. more of sodium borohydride were added, and the mixture was again refluxed for five hours. The methanol was then evaporated, 100 cc. of water were added to the residue, and the resulting aqueous mixture was extracted twice with ether. The ether was evaporated from the combined extract solutions, and the residue was distilled in vacuo. 9 gm. of 3,3-dimethyl-1-(pyridyl-4')-1,2,3,4-tetrahydro-isoquinoline, B.P. 125–126° C. at 0.01 mm. Hg, M.P. 96–98° C., were obtained.

EXAMPLE 3

A solution of 11.8 gm. of 3,4-dihydro-3,3-dimethyl-1-(pyridyl-4')-isoquinoline in 50 cc. of absolute tetrahydrofuran was added dropwise to a solution of 4 gm. of lithium aluminum hydride in 50 cc. of absolute tetrahydrofuran, and the mixed solution was refluxed for five hours while stirring. Thereafter, the reaction mixture was poured into ice water, and the aqueous mixture was made weakly acid with aqueous 50% sulfuric acid, whereby everything went into solution. The acid solution was extracted with ether, the aqueous phase was made strongly alkaline with aqueous 40% sodium hydroxide, the alkaline solution was extracted with ether, the ether extract was evaporated, and the residue was distilled, yielding 5 gm. of 3,3-dimethyl - 1 - (pyridyl - 4')-1,2,3,4-tetrahydro-isoquinoline, M.P. 97–98° C.

EXAMPLE 4

A mixture of 11.8 gm. of 3,4-dihydro-3,3-dimethyl-1-(pyridyl-4')-isoquinoline, 40 gm. of granulated tin, 124 cc. of concentrated hydrochloric acid, 61 cc. of water, 124 cc. of ethanol and 1 drop of an aqueous 5% copper sulfate solution was refluxed for four hours. Thereafter, one-half of the above-indicated volumes of concentrated hydrochloric acid, water and ethanol and another drop of copper sulfate solution were added, and the mixture was refluxed for four hours more. Thereafter, the residual unreacted tin was filtered off, the filtrate was admixed with a sufficient amount of aqueous 40% sodium hydroxide to redissolve the initially precipitated tin-(II)-hydroxide, and the solution was extracted four times with 200 cc.-portions of ethylene chloride. The extract solutions were combined, dried over sodium sulfate and evaporated in vacuo. The residue, which solidified upon cooling, was recrystallized from gasoline, yielding 8 gm. of 3,3-dimethyl-1-(pyridyl-4')-1,2,3,4-tetrahydro-isoquinoline, M.P. 98° C.

EXAMPLE 5

Preparation of 3,3-dimethyl-1-(pyridyl-3')-1,2,3,4-tetrahydro-isoquinoline by method A Using a procedure analogous to that described in Example 4, 3.2 gm. of 3,3-dimethyl-1-(pyridyl-3')-1,2,3,4-tetrahydro-isoquinoline, M.P. 98–99° C., of the formula

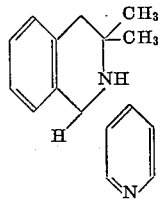

were obtained in the form of colorless crystals from 6.0 gm. of 3,4-dihydro-3,3-dimethyl-1-(pyridyl-3')-isoquinoline.

EXAMPLE 6

11.8 gm. of 3,4-dihydro-3,3-dimethyl-1-(pyridyl-4')-isoquinoline were dissolved in 250 cc. of 2 N sulfuric acid, and the solution was gradually admixed with 25 gm. of zinc dust, accompanied by stirring, taking care that the temperature of the mixture did not rise above +20° C. After all of the zinc dust had been added, the mixture was stirred for eight hours at room temperature. Thereafter, the residual unreacted zinc dust was filtered off, the filtrate was made alkaline with ammonia while cooling, and the alkaline solution was extracted four times with 100 cc.-portions of ethylene chloride. The extract solutions were combined and worked up as described in Example 4. 8.9 gm. of 3,3-dimethyl-1-(pyridyl-4')-1,2,3,4-tetrahydro-isoquinoline, M.P. 98° C., were obtained.

EXAMPLE 7

40 gm. of 3,4-dihydro-3,3-dimethyl-1-(pyridyl-3')-isoquinoline were dissolved in 800 cc. of 2 N hydrochloric acid, 80 gm. of zinc shavings and 1 drop of an aqueous 5% copper sulfate solution were added to the solution, and the mixture was refluxed for eight hours. Thereafter, the reaction mixture was filtered, the filtrate was allowed to cool and was then made alkaline with ammonia while thoroughly cooling with ice, and the cold alkaline solution was extracted four times with 200 cc.-portions of ethylene chloride. The extracts were combined and worked up as described in Example 4, yielding 34 gm. of colorless crystalline 3,3-dimethyl-1-(pyridyl-3')-1,2,3,4-tetrahydroisoquinoline, M.P. 98–99° C.

EXAMPLE 8

11.8 gm. of lithium borohydride were added in small portions over a period of four hours to a solution of 11.8 gm. of 3,4-dihydro-3,3-dimethyl-1-(pyridyl-4')-isoquinoline in 300 cc. of anhydrous ethanol while stirring, taking care that the temperature of the reaction mixture remained between —2 and +2° C. After all of the lithium borohydride had been added, the mixture was stirred for four hours more at +5° C. and was then allowed to stand overnight at room temperature. Thereafter, 100 cc. of aqueous 10% hydrochloric acid were added, the mixture was refluxed for 30 minutes, the ethanol and some of the water were distilled off, and the residue was made alkaline and then extracted four times with 100 cc.-portions of ethylene chloride. The extracts were combined and then worked up as described in Example 4, yielding 7.5 gm. of colorless crystalline 3,3-dimethyl-1-(pyridyl-4') - 1,2,3,4-tetrahydro-isoquinoline, M.P. 98° C.

EXAMPLE 9

A solution of 11.8 gm. of 3,4-dihydro-3,3-dimethyl-1-(pyridyl-4')-isoquinoline in 120 cc. of anhydrous tetrahydrofuran was cooled to —20° C. and, while maintaining this temperature, a suspension of 11.8 gm. of lithium borohydride in 175 cc. of anhydrous ether was added thereto. The mixture was allowed to warm to +20° C. over a period of two hours, was then stirred overnight at room temperature and was subsequently refluxed for two hours. Thereafter, the reaction mixture was admixed with 300 cc. of water, the aqueous mixture was made distinctly alkaline with sodium hydroxide, and the alkaline mixture was extracted four times with 150 cc.-portions of ethylene choride. The extracts were combined, dried over sodium sulfate and evaporated, leaving as a residue a borine-adduct which, when recrystallized from acetone, had a melting point of 136–137° C. This residue was combined with a mixture of 100 cc. of methanol and 100 cc. of an aqueous 1% solution of hydrochloric acid, and the mixture was refluxed for 30 minutes. Thereafter, the methanol was distilled off, and the residue was made alkaline with sodium hydroxide and was extracted three times with 100 cc.-portions of ethylene chloride. The extracts were combined and worked up as described in Example 4, yielding 8 gm. of 3,3-dimethyl-1-(pyridyl-4')-1,2,3,4-tetrahydro-isoquinoline, M.P. 98° C.

EXAMPLE 10

Preparation of 3,3-dimethyl-2-formyl-1-(pyridyl-4')-1,2,3,4-tetrahydro-isoquinoline by method A 5 gm. of 3,4-dihydro-3,3-dimethyl-1-(pyridyl-4')-isoquinoline were dissolved in 75 cc. of an aqueous 75% formic acid solution, 5 gm. of Raney nickel were added thereto, and the mixture was refluxed for five hours. Thereafter, the reaction mixture was allowed to cool, was then filtered, and the filtrate was made alkaline with ammonia and was extracted with ether. The extract solution was dried over sodium sulfate, and the ether was evaporated. The residue was boiled briefly with 50 cc. of petroleum ether, and the mixture was vacuum filtered while still hot. The filter cake was recrystallized from ethyl acetate, yielding 2.5 gm. of 3,3-dimethyl-2-formyl-1-(pyridyl-4')-1,2,3,4-tetrahydro-isoquinoline, M.P. 156° C., of the formula

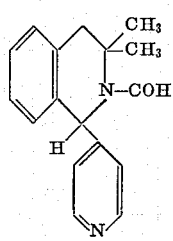

Its hydrochloride had a melting point of 221–222° C. (decomposition).

EXAMPLE 11

Using a procedure analogous to that described in Example 10, 3,3-dimethyl-2-formyl-1-(pyridyl - 3') - 1,2,3,4-tetrahydro-isoquinoline, M.P. 120–122° C., was prepared from 3,4 - dihydro - 3,3-dimethyl-1-(pyridyl-3')-isoquinoline. Its hydrochloride had a melting point of 222° C.

EXAMPLE 12

When the procedure of Example 10 was repeated, but the reaction mixture was refluxed for only one hour, cooling of the hot petroleum ether filtrate precipitated 3.5 gm. of 3,3-dimethyl-1-(pyridyl-4')-1,2,3,4-tetrahydroisoquinoline, M.P. 96–98° C. The filter cake yielded 0.2 gm. of 3,3-dimethyl-2-formyl-1-(pyridyl-4')-1,2,3,4-tetrahydroisoquinoline, M.P. 158° C.

EXAMPLE 13

8 gm. of 3,4-dihydro-3,3-dimethyl-1-(pyridyl-4')-isoquinoline-dihydrochloride were admixed with 28 cc. of 100% formic acid and 140 cc. of formamide, and the mixture was heated for nine hours at 150–160° C. on an oil bath. Thereafter, the reaction mixture was allowed to cool and was then made alkaline with ammonia. The crystalline precipitate formed thereby was separated by vacuum filtration and washed with water. 5.5 gm. of colorless 3,3-dimethyl-2-formyl-1-(pyridyl-4')-1,2,3,4-tetrahydro-isoquinoline, M.P. 156° C., were obtained.

EXAMPLE 14

Preparation of 1-(pyridyl-4')-2,3,3-trimethyl-1,2,3,4-tetrahydro-isoquinoline by method C 12 cc. of aqueous 40% formaldehyde and 5 gm. of Raney nickel were added to a solution of 17.7 gm. of 3,4-dihydro-3,3-dimethyl-1-(pyridyl - 4')-isoquinoline in 100 cc. of methanol, and the mixture was hydrogenated at 50° C. and 50 atmospheres pressure in an autoclave until the calculated amount of hydrogen had been absorbed. Thereafter, the catalyst was removed by vacuum filtration, the methanol was evaporated from the filtrate, the residue was taken up in ether, the solution was washed several times with water, and the ether was evaporated. The residual oil was distilled in vacuo. 11 gm. of 1-(pyridyl-4')-2,3,3-trimethyl - 1,2,3,4 - tetrahydro-isoquinoline, B.P. 120–121° C. at 0.07 mm. Hg, were obtained. Recrystallized from petroleum ether, the product had a melting point of 78–79° C. and was found to have the structural formula

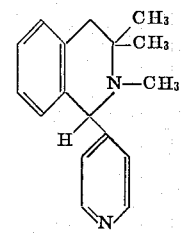

EXAMPLE 15

A mixture of 4 gm. of 3,4-dihydro-3,3-dimethyl-1-(pyridyl-4')-isoquinoline, 6 gm. of aqueous 98% formic acid and 1.8 gm. of paraformaldehyde was refluxed for 5 to 6 hours. Thereafter, the reaction solution was poured into water, and the aqueous solution was made alkaline with ammonia and was then extracted with ether. The extract solution was extracted three times with aqueous 10% hydrochloric acid, and the combined aqueous acid extracts were again made alkaline with ammonia. The oil precipitated thereby was taken up in ether, the ether was evaporated from the resulting solution, and the residue was distilled in vacuo. 2 gm. of 1-(pyridyl-4')-2,3,4-trimethyl-1,2,3,4-tetrahydro-isoquinoline, B.P. 120° C. at 0.07 mm. Hg, M.P. 78° C. (from petroleum ether), were obtained.

EXAMPLE 16

Using a procedure analogous to that described in Example 1, 1-(pyridyl-4')-3,3-diethyl - 1,2,3,4 - tetrahydro-isoquinoline, M.P. 88–90° C., of the formula

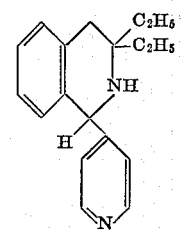

was prepared from 3,4-dihydro-3,3-diethyl-1-(pyridyl-4')-isoquinoline. Its hydrogenmaleate had a melting point of 150–151° C. (decomposition).

EXAMPLE 17

Using a procedure analogous to that described in Example 15, 1-(pyridyl-4')-2,3-dimethyl-3-ethyl-1,2,3,4-tetrahydro-isoquinoline, M.P. 69–72° C., of the formula

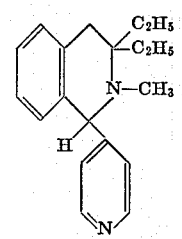

was prepared from 3,4-dihydro-3,3-diethyl-1-(pyridyl-4')-isoquinoline. Its hydrogenmaleate had a melting point of 132–133° C.

EXAMPLE 18

Using a procedure analogous to that described in Example 15, 1-(pyridyl-4′)-2,3-dimethyl-3-ethyl-1,2,3,4-tetrahydro-isoquinoline, M.P. 69–72° C., of the formula

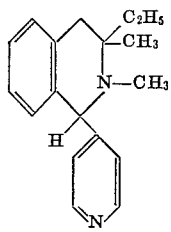

was prepared from 3,4-dihydro-3-methyl-3-ethyl-1-(pyridyl-4′)-isoquinoline. Its dihydrochloride had a melting point of 235° C. (decomposition).

EXAMPLE 19

Using a procedure analogous to that described in Example 1, 1-(pyridyl-4′)-3,3,4-trimethyl-1,2,3,4-tetrahydro-isoquinoline, B.P. 129–130° C. at 0.1 mm. Hg, M.P. 106–108° C., of the formula

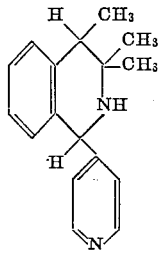

was prepared from 3,4-dihydro-3,3,4-trimethyl-1-(pyridyl-4′)-isoquinoline. Its dihydrochloride had a melting point of 255° C.

EXAMPLE 20

Using a procedure analogous to that described in Example 2, 1-(pyridyl-4′)-3,3-diethyl-7-chloro-1,2,3,4-tetrahydro-isoquinoline, B.P. 175–176° C. at 0.2 mm. Hg, of the formula

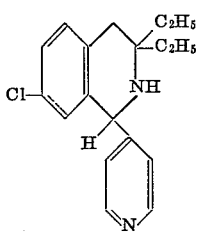

was prepared from 3,4-dihydro-3,3-diethyl-7-chloro-1-(pyridyl-4′)-isoquinoline. Its dihydrochloride had a melting point of 210° C. (decomposition).

EXAMPLE 21

Using a procedure analogous to that described in Example 1, 1-(pyridyl-4′)-3-benzyl-3-methyl-1,2,3,4-tetrahydro-isoquinoline of the formula

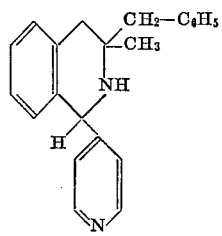

was prepared from 3,4-dihydro-3-benzyl-3-methyl-1-(pyridyl-4′)-isoquinoline. Its dihydrochloride had a melting point of 226–227° C.

EXAMPLE 22

Using a procedure analogous to that described in Example 14, 1-(pyridyl-4′)-2,3,3,7-tetramethyl-1,2,3,4-tetrahydro-isoquinoline, M.P. 123–124° C., of the formula

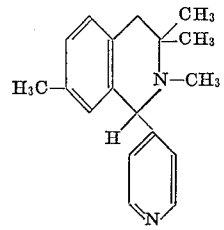

was prepared from 3,4-dihydro-3,3,7-trimethyl-1-(pyridyl-4′)-isoquinoline. Its dihydrochloride had a melting point of 232–234° C. (decomposition).

EXAMPLE 23

Using a procedure analogous to that described in Example 1, 1-(pyridyl-4′)-3-(p-methyl-benzyl)-3,7-dimethyl-1,2,3,4-tetrahydro-isoquinoline of the formula

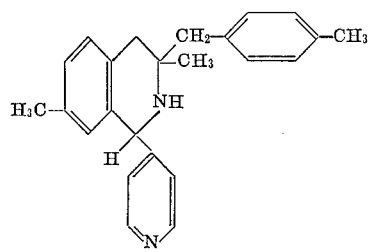

was prepared from 3,4-dihydro-3-(p-methyl-benzyl)-3,7-dimethyl-1-(pyridyl-4′)-isoquinoline. Its hydrogenmaleate had a melting point of 180° C. (decomposition).

EXAMPLE 24

Using a procedure analogous to that described in Example 15, 1-(pyridyl-3′)-2,3,3-trimethyl-1,2,3,4-tetrahydro-isoquinoline, M.P. 71° C., of the formula

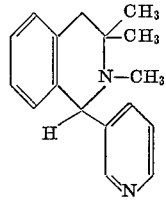

was prepared from 3,4-dihydro-3,3-dimethyl-1-(pyridyl-3′)-isoquinoline. Its dihydrochloride had a melting point of 180° C. (decomposition).

EXAMPLE 25

Using a procedure analogous to that described in Example 1, 1-(4′-methyl-pyridyl-3′)-3,3-dimethyl-1,2,3,4-tetrahydro-isoquinoline, M.P. 112–114° C., of the formula

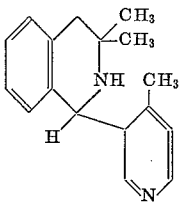

was prepared from 3,4-dihydro-3,3-dimethyl-1-(4′-methyl-pyridyl-3′)-isoquinoline. Its dihydrochloride had a melting point of 227° C. (decomposition).

EXAMPLE 26

Preparation of 3,3-dimethyl-1-(pyridyl-4′)-1,2,3,4-tetrahydro-isoquinoline by method B (a) 4-pyridylmethylidene-(1,1-dimethyl-2-phenyl)-ethylamine.—14.9 gm. of 1-phenyl-2-methyl-2-propylamine were added dropwise, accompanied by stirring, to 10.7 gm. of pyridine-4-aldehyde, whereby the internal temperature of the reaction mixture rose due to evolution of heat and water was split off. The reaction mixture was then stirred for two hours at room temperature, ether was added thereto, the aqueous phase was separated, and the ether phase was dried over sodium sulfate and the ether was distilled off, leaving an oil which was distilled in vacuo. 21 gm. of the Schiff's base 4 - pyridylmethylidene-(1,1 - dimethyl-2-phenyl)-ethylamine, B.P. 121–122° C. at 0.05 mm. Hg, were obtained.

(b) 3,3-dimethyl-1-(pyridyl-4') - 1,2,3,4-tetrahydro-isoquinoline.—23.8 gm. of 4 - pyridylmethylidene - (1,1-dimethyl-2-phenyl)-ethylamine were admixed with 100 cc. of o-dichlorobenzene and 200 gm. of polyphosphoric acid, and the mixture was heated for 4 to 5 hours at about 100° C. on an oil bath, accompanied by stirring. Thereafter, the reaction mixture was poured into warm water, and the aqueous solution was made alkaline with aqueous 40% sodium hydroxide and was then extracted several times with 50 cc.-portions of ether. The combined ether extracts were extracted three times with 30 cc.-portions of aqueous 12% hydrochloric acid, and the combined aqueous acid extract solutions were again made alkaline with aqueous 40% sodium hydroxide. The oil initially precipitated thereby solidified into a crystalline substance, which was collected by vacuum filtration and recrystallized from petroleum ether. 16.5 gm. of 3,3-dimethyl-1-(pyridyl-4')-1,2,3,4-tetrahydro-isoquinoline, M.P. 97–98° C., were obtained.

EXAMPLE 27

Using procedures analogous to those described in Example 26 (a) and (b), 14 gm. of 3,3-dimethyl-1-(pyridyl-3')-1,2,3,4-tetrahydro-isoquinoline, M.P. 100° C. (recrystallized from petroleum ether), were obtained from 0.1 mol of pyridine-3-aldehyde through 0.1 mol of 3 - pyridylmethylidene - (1,1 - dimethyl-2-phenyl)-ethylamine, B.P. 119–120° C. at 0.05 mm. Hg, as an intermediate.

EXAMPLE 28

Using procedures analogous to those described in Example 26 (a) and (b), 11 gm. of 3-ethyl-3-methyl-1-(pyridyl-4')-1,2,3,4-tetrahydro-isoquinoline, M.P. 86–87° C. (recrystallized from gasoline), were obtained from 0.1 mol of 1-phenyl-2-methyl-2-n-butylamine and 0.1 mol of pyridine-4-aldehyde through 0.1 mol of 4-pyridylmethylidene-(1-ethyl-1-methyl-2-phenyl)-ethylamine, B.P. 125° C. at 0.05 mm. Hg, as an intermediate.

EXAMPLE 29

Using procedures analogous to those described in Example 26 (a) and (b), 18.5 gm. of 3,3,7-trimethyl-1-(pyridyl-4') - 1,2,3,4-tetrahydro-isoquinoline, M.P. 123–125° C. (recrystallized from ligroin), were obtained from 0.1 mol of 1-(p-methyl-phenyl)-2-methyl-2-propylamine and 0.1 mol of pyridine-4-aldehyde through 0.1 mol of 4 - pyridylmethylidene - [1,1 - dimethyl - 2 - (p - methylphenyl)]-ethylamine, B.P. 132° C. at 0.05 mm. Hg, as an intermediate.

EXAMPLE 30

Using procedures analogous to those described in Example 26 (a) and (b), 11.5 gm. of 3,3,4-trimethyl-1-(pyridyl - 4' - 1,2,3,4-tetrahydro-isoquinoline, M.P. 106–108° C., (recrystallized from petroleum ether), were obtained from 0.1 mol of 2-phenyl-3-methyl-3-n-butylamine and 0.1 mol of pyridine-4-aldehyde through 0.1 mol of 4 - pyridylmethylidene - (1,1,2 - trimethyl - 2 - phenyl)-ethylamine, B.P. 127–128° C. at 0.05 mm. Hg, as an intermediate.

EXAMPLE 31

5.8 gm. of 4 - pyridylmethylidene - (1,1 - dimethyl-2-phenyl)-ethylamine were admixed with 200 cc. of tetrahydronaphtalene and 31 gm. of phosphorus pentoxide, and the mixture was refluxed for 15 minutes on an oil bath. Thereafter, 31 gm. more of phosphorus pentoxide were added, and the mixture was again refluxed for 15 minutes on an oil bath. The reaction mixture was then allowed to cool, the tetrahydronaphthalene was decanted, and the solid residue was taken up in warm water. While cooling, the resulting aqueous solution was made strongly alkaline with sodium hydroxide and was then extracted with chloroform. The chloroform extract solution was in turn extracted three times with 25 cc.-portions of dilute hydrochloric acid, the aqueous acid extract was made alkaline with sodium hydroxide, the alkaline solution was again extracted with chloroform, and the chloroform was distilled out of the extract solution. 2 gm. of raw 3,3-dimethyl - 1 - (pyridyl-4')-1,2,3,4-tetrahydro-isoquinoline remained as a residue, which had a melting point of 96–98° C. after recrystallization from petroleum ether.

EXAMPLE 32

5.8 gm. of 4-pyridylmethylidene - (1,1 - dimethyl-2-phenyl)-ethylamine were admixed with 30 cc. of o-dichlorobenzene and 25 cc. of 100% phosphoric acid, and the mixture was heated at 105° C. for twelve hours on an oil bath. Thereafter, the reaction mixture was allowed to cool, was then poured into water, the aqueous mixture was extracted with ether, and the ether extract was discarded. The aqueous acid solution was made alkaline with ammonia and was dried over sodium sulfate and then evaporated. 5.5 gm. of 3,3-dimethyl-1-(pyridyl-4')-1,2,3,4-tetrahydro-isoquinoline, M.P. 96–98° C., were obtained.

EXAMPLE 33

Preparation of 2,3,3,-trimethyl-1-(pyridyl-4')-1,2,3,4-tetrahydro-isoquinoline by method C 1.8 gm. of paraformaldehyde were dissolved in 6 gm. of aqueous 98% formic acid by warming a mixture thereof on a water bath. While vigorously stirring the solution, 4 gm. of 3,3-dimethyl-1-(pyridyl-4')-1,2,3,4-tetrahydro-isoquinoline were added thereto, and the mixture was heated at 70 to 80° C. for 15 minutes. Thereafter, the reaction mixture was stirred into water, and the aqueous solution was neutralized with sodium carbonate and then extracted with chloroform. The chloroform extract was evaporated, leaving as a residue an oily substance which crystallized upon standing for some time; it was identified as raw 2,3,3-trimethyl-1-(pyridyl-4')-1,2,3,4-tetrahydro-isoquinoline.

The raw base was dissolved in ether, and the resulting solution was acidified with hydrochloric acid, yielding 3.5 gm. of 2,3,3-trimethyl-1-(pyridyl-4')-1,2,3,4-tetrahydro-isoquinoline dihydrochloride, M.P. 243° C. (decomposition).

Its dihydrogensulfate had a melting point of 234° C. (decomposition).

EXAMPLE 34

7.1 gm. of 3,3-dimethyl-1-(pyridyl-4')-1,2,3,4-tetrahydro-isoquinoline and 3.5 cc. of aqueous 40% formaldehyde were dissolved in 40 cc. of methanol, 2 gm. of Raney nickel were added thereto, the mixture was charged into a shaking autoclave and was shaken at 50° C. under a pressure of 50 atmospheres for four hours while introducing hydrogen into the autoclave. Thereafter, the reaction mixture was vacuum-filtered, the methanol was evaporated from the filtrate, the residue was taken up in ether, and the resulting solution was extracted with water, dried and evaporated. The residue was dissolved in ether, and the solution was acidified with ethereal hydrochloric acid, yielding 6.8 gm. of 2,3,3-trimethyl-1-(pyridyl - 4') - 1,2,3,4 - tetrahydro-isoquinoline dihydrochloride, M.P. 243° C. (decomposition).

EXAMPLE 35

A solution of 8 gm. of 2 - formyl - 3,3 - dimethyl-1-(pyridyl - 4') - 1,2,3,4-tetrahydroisoquinoline in 100 cc.

of anhydrous tetrahydrofuran was added dropwise to a solution of 2.3 gm. of lithium aluminum hydride in 50 cc. of anhydrous tetrahydrofuran, accompanied by stirring, and the mixture was refluxed for eight hours while stirring. Thereafter, the reaction mixture was poured into ice water, and the aqueous mixture was made strongly acid with aqueous 50% sulfuric acid, whereby all undissolved matter went into solution. The solution was then made alkaline with aqueous 40% sodium hydroxide while cooling, and the alkaline mixture was extracted with ether. The ether extract was dried with sodium sulfate, and the ether was then evaporated, leaving 6 gm. of raw 2,3,4 - trimethyl - 1-(pyridyl-4')-1,2,3,4-tetrahydro-isoquinoline.

The raw free base was transformed into its dihydrochloride addition salt, which was then recrystallized from isopropanol. It had a melting point of 243° C. (decomposition).

EXAMPLE 36

Preparation of 2-acetyl-3,3-dimethyl-1-(pyridyl-4')-1,2,3,4-tetrahydro-isoquinoline by method C 23.8 gm. of 3,3-dimethyl-1-(pyridyl-4')-1,2,3,4-tetrahydro-isoquinoline and 11.6 gm. of N-ethyl-piperidine were dissolved in 200 cc. of chloroform, and then, while stirring, a solution of 8.15 gm. of acetylchloride in 100 cc. of chloroform was added dropwise at a temperature of 0 to +5° C. Thereafter, the mixed solution was heated for three hours on a boiling water bath while stirring, the chloroform was distilled off, the residue was introduced into water, and the oil precipitated thereby was extracted with ether. The ether was distilled out of the extract solution, and the solid residue was recrystallized first from ethyl acetate and then from acetone. 10.5 gm. of colorless crystalline 2-acetyl-3,3-dimethyl - 1 - (pyridyl-4')-1,2,3,4-tetrahydro-isoquinoline, M.P. 202–204° C., of the formula

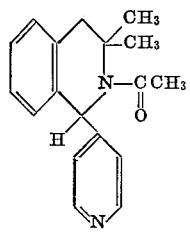

were obtained.

The hydrochloride, obtained by dissolving the free base in ether, acidifying the solution with ethereal hydrochloric acid, and boiling the precipitate with isopropanol, had a melting point of 262–263° C.

EXAMPLE 37

A mixture of 5 gm. of 3,3-dimethyl-1-(pyridyl-4')-1,2,3,4-tetrahydro-isoquinoline and 15 cc. of aqueous 85% formic acid was heated for eight hours, while stirring, on an oil bath at a temperature of 150 to 160° C. Thereafter, the reaction mixture was poured into about 200 cc. of water, the aqueous solution was made alkaline with ammonia, and the colorless precipitate formed thereby was collected by vacuum filtration. 5 gm. of raw 2-formyl-3,3-dimethyl - 1 - (pyridyl-4')-1,2,3,4-tetrahydro-isoquinoline were obtained which, after recrystallization from ethyl acetate, had a melting point of 156° C.

EXAMPLE 38

Preparation of 1-(pyridyl-3')-2,3,3-trimethyl-1,2,3,4-tetrahydro-isoquinoline by method D A solution of 15.8 gm. of 3-bromo-pyridine in 40 cc. of absolute tetrahydrofuran and a solution of 37.5 gm. of ethylene bromide in 100 cc. of absolute tetrahydrofuran, each in a separate dropping funnel, were simultaneously added under exclusion of water to 7.3 gm. of magnesium shavings, and the mixture was refluxed for two hours.

Thereafter, 10.7 gm. of 2,3,3-trimethyl-3,4-dihydro-isoquinolinium iodide (M.P. 130° C.) were added to the reaction mixture in small portions, and the mixture was again refluxed for eight hours. Thereafter, the tetrahydrofuran was evaporated and replaced with toluene. The resulting mixture was decomposed with hydrochloric acid while cooling with ice, was then made alkaline with ammonia, and the aqueous phase was extracted with ether. The ether extract was dried and evaporated, and the oily residue was fractionally distilled in vacuo. The fraction passing over between 95 and 108° C. at 0.02 mm. Hg was collected and recrystallized from ligroin, yielding 2.2 gm. of 1-(pyridyl-3')-2,3,3-trimethyl - 1,2,3,4 - tetrahydro-isoquinoline, M.P. 70–70.5° C.

EXAMPLE 39

Preparation of 2-ethyl-3,3-dimethyl-1-(pyridyl-4')-1,2,3,4-tetrahydro-isoquinoline by method C 3.5 gm. of 2-acetyl-3,3-dimethyl-1-(pyridyl-4')-1,2,3,4-tetrahydro-isoquinoline were added in small portions to a solution of 3.25 gm. of lithium aluminum hydride in 150 cc. of anhydrous ether, and the resulting mixture was refluxed for six hours. Thereafter, the residual unreacted lithium aluminum hydride was decomposed with ethyl acetate, the mixture was poured over ice, and the aqueous solution was made acid with hydrochloric acid. The ether phase was separated and discarded. The acid aqueous phase was made alkaline with sodium hydroxide, the oil precipitated thereby was taken up in ether, the ethereal solution was evaporated, and the residue was recrystallized from petroleum ether. 2.5 gm. of colorless crystalline 2-ethyl-3,3-dimethyl-1-(pyridyl-4')-1,2,3,4-tetrahydro - isoquinoline, M.P. 72–73° C., of the formula

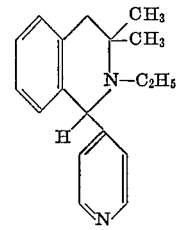

were obtained.

EXAMPLE 40

Preparation of 1-(pyridyl-3')-2,3,3-trimethyl-1,2,3,4-tetrahydro-isoquinoline by method D An ethereal solution of n-butyl lithium, prepared by dissolving 2.1 gm. of lithium and 14.4 gm. of n-butyl chloride in 60 cc. of absolute ether, was admixed in an atmosphere of nitrogen at −45° C. with a solution of 23 gm. of 3-bromo-pyridine in 25 cc. of absolute ether, and the mixed solution was stirred at −45° C. for forty minutes. Thereafter, 15.05 gm. of 2,3,3-trimethyl-3,4-dihydro-isoquinolinium iodide were added at −60° C. by means of a dropping funnel, the funnel was rinsed with a small amount of ether, and the mixture was stirred for several hours at −55° C. Thereafter, the reaction mixture was allowed to stand for about 60 hours on the thawing cooling bath. The reaction mixture was then refluxed for two hours and thereafter decomposed at +5° C. with 250 cc. of ice water. The ether phase was separated, the aqueous phase was extracted several times with ether, the extract solutions were added to the ether phase, and the combined ethereal solution was dried with sodium sulfate and then evaporated in vacuo. The residual liquid was fractionally distilled in vacuo, the fraction passing over between 91 and 96° C. at 0.04 mm. Hg was purified by chromatography on silicagel and the purified product was recrystallized from ligroin. 1.7 gm. of 1-(pyridyl-3')-2,3,3-trimethyl-1,2,3,4-tetrahydro-isoquinoline, M.P. 70–71° C., were obtained.

EXAMPLE 41

A solution of 23.7 gm. of 4-bromo-pyridine in 120 cc. of absolute tetrahydrofuran and a solution of 56.5 gm. of ethylene bromide in 250 cc. of absolute tetrahydrofuran, each in separate dropping funnels, were simultaneously added to a mixture of 10.5 gm. of magnesium shavings and 60 cc. of absolute ether, and the reaction mixture was refluxed for two hours. Thereafter, 10.7 gm. of 2,3,3-trimethyl-3,4-dihydro-isoquinolinium iodide were added in small portions, and the mixture was again refluxed for eight hours. Subsequently, the tetrahydrofuran was evaporated and was replaced with toluene, the reaction mixture was decomposed with hydrochloric acid while cooling with ice, the aqueous phase was made alkaline with sodium hydroxide, and the precipitated oil was extracted with ether. The extract solution was dried with sodium sulfate, the ether was evaporated in vacuo, and the liquid residue was fractionally distilled in vacuo. The fraction passing over between 128 and 135° C. at 0.15 mm. Hg was taken up in ether, the resulting solution was made acid with anhydrous hydrochloric acid, and the precipitate formed thereby was collected and recrystallized from isopropanol. 1.9 gm. of 1-(pyridyl-4')-2,3,3-trimethyl-1,2,3,4-tetrahydro-isoquinoline dihydrochloride, M.P. 235° C. (decomposition), were obtained.

EXAMPLE 42

A solution of 15.8 gm. of 3-bromo-pyridine in 100 cc. of absolute ether and a solution of 37.6 gm. of ethylene bromide in 220 cc. of absolute ether were simultaneously added to 7.2 gm. of magnesium shavings under exclusion of water. The resulting mixture was refluxed for one hour, then 7.6 gm. of 2-ethyl-3,3-dimethyl-3,4-dihydro-isoquinolinium iodide (M.P. 158–159° C.) were added in small portions at room temperature, and the mixture was again refluxed for five and a half hours. Thereafter, while cooling, the reaction mixture was decomposed with 250 cc. of 5 N hydrochloric acid, the ether phase was extracted several times with hydrochloric acid, the acid aqueous extract solutions were combined with the aqueous phase, and the combined solution was made alkaline with ammonia and was then extracted with ether. The ether extract solution was dried with sodium sulfate and then evaporated. The liquid residue was fractionally distilled in vacuo, yielding 3.9 gm. of 2-ethyl-3,3-dimethyl-1-(pyridyl-3')-1,2,3,4-tetrahydro-isoquinoline, B.P. 122–125° C. at 0.09 mm. Hg.

The compounds according to the present invention, that is, those embraced by Formula I above and their non-toxic, pharmacologically acceptable acid addition salts, have useful pharmacodynamic properties. More particularly, they exhibit antiphlogistic, antipyretic, analgesic and spasmolytic activities in warm-blooded animals, such as rats.

A few representative species of the compounds of the invention were tested for antiphlogistic and antipyretic activities in laboratory rats by standard pharmacological test methods.

The determination of the antiphlogistic activity was carried out by means of the carragenin-edema of the rat's paw, using the method of Winter et al., J. Pharmacol. exper. Ther. 141, 369 (1963). 0.05 cc. of an aqueous 1% carragenin solution was administered by subplantar injection to a statistically significant number of adult laboratory rats in order to induce an artificial edema. The compound to be tested for antiphlogistic activity was administered perorally one hour prior to the carragenin solution, and the volume of the edema was measured four hours after administration of the compound under investigation. The edema volume in the treated animals was compared with the edema volume in control animals which had received only the subplantar injection of carragenin solution, and the reduction in the edema volume of the treated animals, if any, was expressed in terms of percent, based on the edema volume of 100% in the control animals.

For determination of the antipyretic activity, the rectal temperature of a statistically significant number of adult laboratory rats with normal body temperature was continuously measured and recorded. The compound under investigation was administered to the test animals intraperitoneally in the form of an aqueous 0.5% suspension in a water-soluble cellulose ether. The median maximum reduction in body temperature was calculated.

The following compounds were tested for antiphlogistic and antipyretic activity:

(A) 1-(pyridyl-4')-1,2,3,4-tetrahydro-2,3,3-trimethyl-isoquinoline dihydrochloride.
(B) 1-(pyridyl-4')-1,2,3,4-tetrahydro-3,3-dimethyl-isoquinoline hydrogen maleate.
(C) 1-(pyridyl-4')-1,2,3,4-tetrahydro-3,3-diethyl-isoquinoline hydrogen maleate.
(D) 1-(pyridyl-4')-1,2,3,4-tetrahydro-2,3-dimethyl-3-ethyl-isoquinoline dihydrochloride.
(E) 1-(pyridyl-4')-1,2,3,4-tetrahydro-2-formyl-3,3-dimethyl-isoquinoline hydrochloride.
(F) 1-pyridyl-3')-1,2,3,4-tetrahydro-2-formyl-3,3-dimethyl-isoquinoline hydrochloride.
(G) 1-(pyridyl-4')-1,2,3,4-tetrahydro-2-formyl-3-ethyl-3-methyl-isoquinoline.
(H) 1-(pyridyl-4')-1,2,3,4-tetrahydro-2-ethyl-3,3-dimethyl-isoquinoline.

The following table shows the results of these pharmacological tests.

TABLE

| Compound | Antiphlogistic activity (Carragenin edema in rat's paw) | | | Antipyretic activity | | |
|---|---|---|---|---|---|---|
| | No. of animals | Dose, mgm./kg. p.o. | Percent reduction in swelling | No. of animals | Dose, mgm./kg. i.p. | Max. reduction of body temperature, °C. |
| A | 6 | 100 | 50.6 | 6 | 100 | 3.1 |
| B | 6 | 100 | 44.6 | 6 | 100 | 3.0 |
| C | 6 | 100 | 42.9 | 6 | 100 | 4.8 |
| D | 6 | 100 | 41.5 | 6 | 100 | 3.6 |
| E | 6 | 50, 100 | 51.7, 63.2 | 6 | 100 | 4.1 |
| F | 6 | 100 | 40.6 | 6 | 100 | 3.5 |
| G | 6 | 100 | 37.7 | 6 | 100 | 5.0 |
| H | 6 | 100 | 69.5 | 6 | 100 | 1.7 |

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one dosage unit of the active ingredient, such as tablets, coated pills, wafers, capsules, solutions, suspensions, emulsions, syrups, suppositories and the like. One dosage unit of the compounds according to the invention is 0.4 to 10 mgm./kg. body weight.

The following examples illustrate a few dosage unit compositions comprising a compound of the present invention as an active ingredient, and represent the best mode contemplated of putting the invention to practical use. The parts are parts by weight unless otherwise specified.

EXAMPLE 43

Tablets

The tablet composition was compounded from the following ingredients:

| | Parts |
|---|---|
| 3,3 - dimethyl-2-formyl-1-(pyridyl - 4') - 1,2,3,4-tetrahydro-isoquinoline | 150.0 |
| Colloidal silicic acid | 100.0 |
| Lactose | 240.0 |
| Potato starch | 100.0 |
| Tartaric acid | 5.0 |
| Magnesium stearate | 5.0 |
| Total | 600.0 |

Compounding procedure

The tetrahydroisoquinoline compound was intimately admixed with the colloidal silicic acid, the lactose and about one-half of the potato starch, the mixture was moistened with an aqueous 3.5% solution of the tartaric acid, and the moist mass was forced through a 1.5 mm.-mesh screen. The resulting moist granulate was dried at 45° C., then again passed through the screen, and the dry granulate was admixed with the remaining amount of potato starch and the magnesium stearate. The mixture was finally pressed into 600 mgm.-tablets with the aid of a conventional tablet making machine. Each tablet contained 150 mgm. of the tetrahydroisoquinoline compound.

EXAMPLE 44

Coated pills

The pill core composition was compounded from the following ingredients:

| | Parts |
|---|---|
| 3,3 - dimethyl - 2 - formyl - 1 - (pyridyl-4')-1,2,3,4-tetrahydro-isoquinoline | 25.0 |
| Colloidal silicic acid | 15.0 |
| Lactose | 63.0 |
| Potato starch | 15.0 |
| Tartaric acid | 1.0 |
| Magnesium stearate | 1.0 |
| Total | 120.0 |

Compounding procedure

The ingredients were compounded in the manner described in the preceding example, and the finished mixture was pressed into 120 mgm.-pill cores, which were then coated with a thin shell consisting essentially of sugar and talcum, and the coated pills were polished with beeswax. Each pill weighed approximately 200 mgm., and contained 25 mgm. of the tetrahydroisoquinoline compound.

EXAMPLE 45

Hypodermic solution

The solution was compounded from the following ingredients:

| | Parts |
|---|---|
| 3,3 - dimethyl - 2 - formyl - 1 - (pyridyl-4')-1,2,3,4-tetrahydroisoquinoline | 50.0 |
| Citric acid·$H_2O$ | 14.0 |
| Secondary sodium phosphate·$2H_2O$ | 6.0 |
| Distilled water, q.s. ad 2000.0 parts by vol. | |

Compounding procedure

The citric acid, the sodium phosphate and the tetrahydroisoquinoline compound were successively dissolved in a sufficient amount of distilled water, and the solution was diluted with additional distilled water to the desired volume and then filtered until free from suspended particles. The filtrate was filled into brown 2 cc.-ampules, which were sealed and then sterilized for thirty minutes at 100° C. The solution in each ampule contained 50 mgm. of the tetrahydroisoquinoline compound.

EXAMPLE 46

Suppositories

The suppository composition was compounded from the following ingredients:

| | Parts |
|---|---|
| 3,3 - dimethyl - 2 - formyl-1-(pyridyl-4')-1,2,3,4-tetrahydro-isoquinoline | 100.0 |
| Cocoa butter | 1630.0 |
| Total | 1730.0 |

Compounding procedure

The cocoa butter was melted and then cooled to 40° C., and the finely pulverized tetrahydroisoquinoline compound was stirred in with the aid of an immersion homogenizer. The resulting mixture was then poured into cooled suppository molds, each holding 1730 mgm. of the mixture. Each suppository contained 100 mgm. of the tetrahydroisoquinoline compound.

Although the above dosage unit examples illustrate only one specific compound from the class of compounds according to the present invention as an active ingredient, it should be understood that other compounds of the Formula I or their non-toxic acid addition salts may be substituted for the particular tetrahydroisoquinoline in Examples 42 through 46. Moreover, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to those skilled in the art that the invention is not limited to these embodiments and that various changes and modifications may be made without departing from the spirit of the invention or the scope of the appended claims.

We claim:

1. A compound of the formula

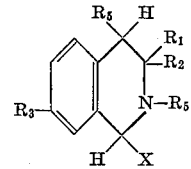

wherein $R_1$ is methyl, ethyl, benzyl or methyl-benzyl,
$R_2$ is methyl or ethyl,
$R_3$ is hydrogen, chlorine or methyl,
$R_5$ is hydrogen or methyl,
$R_6$ is hydrogen, methyl, ethyl, formyl or acetyl, and
X is 3-pyridyl, 4-pyridyl or 4-methyl-pyridyl-3, or a non-toxic, pharmacologically acceptable acid addition salt thereof.

2. A compound according to claim 1, wherein $R_1$ and $R_2$ are methyl, $R_3$ and $R_5$ are hydrogen, $R_6$ is formyl, and X is 4-pyridyl, or a non-toxic, pharmacologically acceptable acid addition salt thereof.

3. A compound according to claim 1, wherein $R_1$ and $R_2$ are methyl, $R_3$ and $R_5$ are hydrogen, $R_6$ is ethyl and X is 4-pyridyl, or a non-toxic, pharmacologically acceptable acid addition salt thereof.

4. A compound according to claim 1, wherein $R_1$ and $R_2$ are methyl, $R_3$, $R_5$ and $R_6$ are hydrogen, and X is 4-pyridyl, or a non-toxic, pharmacologically acceptable acid addition salt thereof.

5. A compound according to claim 1, wherein $R_1$ and $R_2$ are ethyl, $R_3$, $R_5$ and $R_6$ are hydrogen, and X is 4-pyridyl, or a non-toxic, pharmacologically acceptable acid addition salt thereof.

6. A compound according to claim 1, wherein $R_1$ is ethyl, $R_2$ and $R_6$ are methyl, $R_3$ and $R_5$ are hydrogen, and X is 4-pyridyl, or a non-toxic, pharmacologically acceptable acid addition salt thereof.

7. A compound according to claim 1, wherein $R_1$ and $R_2$ are methyl, $R_3$ and $R_5$ are hydrogen, $R_6$ is formyl, and X is 3-pyridyl, or a non-toxic, pharmacologically acceptable acid addition salt thereof.

8. A compound according to claim 1, wherein $R_1$, $R_2$ and $R_6$ are methyl, $R_3$ and $R_5$ are hydrogen, and X is 4-pyridyl, or a non-toxic, pharmacologically acceptable acid addition salt thereof.

References Cited

UNITED STATES PATENTS

| | | | |
|---|---|---|---|
| 2,951,013 | 8/1960 | Dengel | 260—288X |
| 3,133,926 | 5/1964 | Kuehne | 260—288X |
| 3,457,265 | 7/1969 | Seeger et al. | 260—288 |

DONALD G. DAUS, Primary Examiner

U.S. Cl. X.R.

260—286, 288, 297, 562, 570.8, 690; 424—258

PO-1050
(5/69)

UNITED STATES PATENT OFFICE

CERTIFICATE OF CORRECTION

Patent No. 3,544,577                 Dated December 1, 1970

Inventor(s) ERNST SEEGER, WOLFHARD ENGEL and HELMUT TEUFEL

It is certified that error appears in the above-identified patent and that said Letters Patent are hereby corrected as shown below:

Col. 1, line 32, formula I should read:

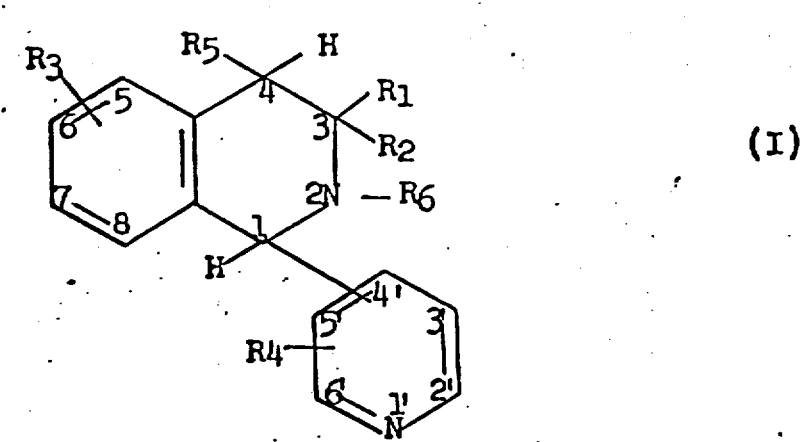

(I)

Col. 8, line 60, "69-72°C." should read --89-91°C.--.

Col. 18, line 52, the formula should read:

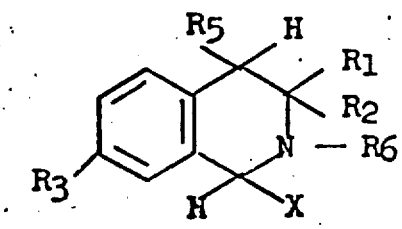

Signed and sealed this 20th day of April 1971.

(SEAL)
Attest:

EDWARD M. FLETCHER, JR.　　　　　　　WILLIAM E. SCHUYLER, JR
Attesting Officer　　　　　　　　　　　Commissioner of Patents

PO-1050
(5/69)

UNITED STATES PATENT OFFICE
CERTIFICATE OF CORRECTION

Patent No. 3,544,577                     Dated December 1, 1970

Inventor(s) ERNST SEEGER, WOLFHARD ENGEL and HELMUT TEUFEL

It is certified that error appears in the above-identified patent and that said Letters Patent are hereby corrected as shown below:

Col. 1, line 6, after "Germany" insert
--assignors to Boehringer Ingelheim G.m.b.H.,
   Ingelheim am Rhein, Germany, a corporation
   of Germany--

Signed and sealed this 6th day of July 1971.

(SEAL)
Attest:

EDWARD M. FLETCHER, JR.              WILLIAM E. SCHUYLER, JR.
Attesting Officer                    Commissioner of Patents